Oct. 7, 1952     C. H. SCHOWALTER     2,612,880
DUAL FUEL ENGINE

Filed Jan. 11, 1947     7 Sheets—Sheet 1

INVENTOR
CLARENCE H. SCHOWALTER
By Paul L. Kroker
ATTORNEY

Oct. 7, 1952 C. H. SCHOWALTER 2,612,880
DUAL FUEL ENGINE
Filed Jan. 11, 1947 7 Sheets-Sheet 2

INVENTOR
CLARENCE H. SCHOWALTER
By Paul L. Kirchner
ATTORNEY

Oct. 7, 1952   C. H. SCHOWALTER   2,612,880
DUAL FUEL ENGINE

Filed Jan. 11, 1947   7 Sheets-Sheet 3

INVENTOR
CLARENCE H. SCHOWALTER
By Paul L. Kiehl
ATTORNEY

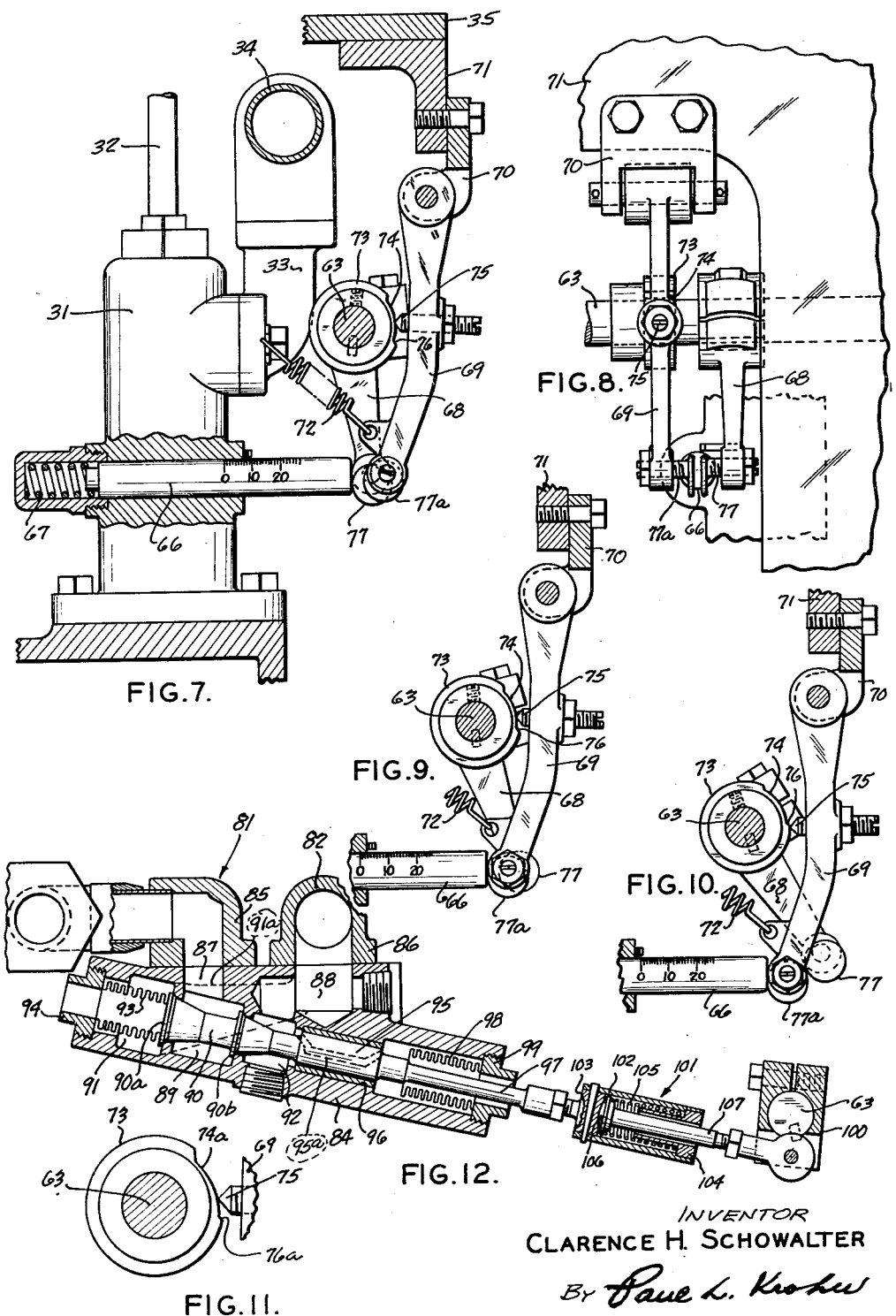

Oct. 7, 1952 C. H. SCHOWALTER 2,612,880
DUAL FUEL ENGINE
Filed Jan. 11, 1947 7 Sheets-Sheet 5

INVENTOR
CLARENCE H. SCHOWALTER
BY Paul L. Krohn
ATTORNEY

Patented Oct. 7, 1952

2,612,880

UNITED STATES PATENT OFFICE 2,612,880

DUAL FUEL ENGINE

Clarence H. Schowalter, Beloit, Wis., assignor to Fairbanks, Morse & Co., Chicago, Ill., a corporation of Illinois Application January 11, 1947, Serial No. 721,549

5 Claims. (Cl. 123—27)

This invention is directed to internal combustion engines generally and especially to engines of the two-cycle diesel character arranged to operate with a liquid or gaseous fuel or with one such fuel supplemented by the other in desired amounts.

An internal combustion engine capable of utilizing fuels of differing characteristics and in keeping with the availability of such fuels, possesses well recognized advantages of flexibility, economy and increased utility. The diesel engine is particularly well suited to this dual fuel operation as it already is considered to be the most efficient engine for converting the energy of liquid fuels into useful work. Recent efforts in this direction have resulted in a number of successful dual fuel diesel engines, but these engines have, for the most part, been of the four-cycle type. One of the major reasons for selecting a four-cycle engine lies in the belief that the use of a gaseous fuel in a normal compression ignition engine requires a positive and close control over the air-gas ratio in order that a premature explosion may be prevented and to obtain an even and desirable combustion of the gaseous fuel. The four cycle diesel engine, therefore, requires a rather complicated control system in which the control over the supply of combustion air must be properly coordinated at all times with the supply of the liquid and gaseous fuels.

On the other hand, a diesel engine of two-cycle type requires no complicating means for establishing a desired air-fuel ratio, as the piston controlled air admission port in the cylinder wall is carefully designed, in regard to piston movement, to supply the required combustion air at all speeds. Experimentation has shown that the gaseous fuel when mixed with combustion air in the cylinder does not ignite at the normal compression pressures developed therein and at which pressure the heat of compression is capable of igniting fuel oil alone. Even so, the two-cycle and four-cycle engines must utilize some liquid fuel as an agent for initiating combustion of the gaseous fuel and for developing a uniform combustion of gaseous fuel. Thus the two-cycle engine is relatively more simple and hence better suited for use as a dual fuel engine.

Accordingly, the present invention objectively is concerned with the adaption of a two-cycle diesel engine to the utilization of liquid and gaseous fuels in a manner in which liquid fuel alone may be used in a conventional diesel engine, or in which varying proportions of both fuels may be used, in keeping with the availability thereof and to the extent that the gaseous fuel may be predominant with the liquid fuel serving as the combustion initiating agent.

Objectively also, this invention seeks to provide, in a dual fuel engine of the diesel type, a simple and positive control system for permitting the use of a liquid fuel alone or for converting the engine to the use of a liquid and gaseous fuel in which the proportioning is automatically achieved, the only limitation being that the supply of liquid fuel never drop below an amount which is insufficient for initiating positive gaseous fuel combustion, and may be no more than is just inadequate of itself for maintaining engine operation at rated idling speed with no load.

An object of the invention is to be found in the construction, arrangement and coordination of means for controlling the supply of liquid and gaseous fuels in accordance with the demands of the engine such that engine load operation may be maintained selectively with a supply of liquid fuel alone, a supply of gaseous fuel attended by continuing supply of liquid fuel in amounts determined to be insufficient of itself for operating the engine at no load and rated idling speed, or with a supply of the liquid and gaseous fuels in varying proportions.

Another object of the present invention resides in the form, construction and arrangement of means for effecting control of the liquid fuel supply means to carry out the foregoing objects, and wherein the control thereof is at times directly responsive to engine load demands, and at other times is subject to secondary control means of a type which may have a constant delivery control effect or one which is variable whereby the supply of liquid fuel is maintained substantially constant but at a minimum delivery, as in the first case, or is maintained at a limited delivery which may vary throughout the gaseous fuel range of engine operation, as in the latter case.

Another object is to be found in the provision of liquid fuel delivery control means embodying primary control means for variably regulating the liquid fuel delivery means in response to demands of the engine and secondary control means operable for maintaining liquid fuel delivery of a predetermined minimum amount, the secondary control being subject for its operation to the attainment by said first or primary control means of a selected range of control thereby rendering the effective control over the liquid fuel delivery means automatic and reversible.

Still another object resides in the arrangement of liquid and gaseous supply means for an internal combustion engine wherein the fuels are separately delivered and introduced to the engine combustion chamber directly but at distinct times in the compression stroke of the piston such that the gaseous fuel delivery occurs in a period of low compression and is intimately mingled with the combustion air and the liquid fuel delivery occurs in a period of high compression and as a combustion initiator for the gaseous fuel, as well as a working fuel at times when the fuels are supplied in supplementary quantities.

Other objects of the invention will appear from the following detailed description of a preferred embodiment disclosed in the accompanying drawing, in which:

Fig. 3 is an enlarged and fragmentary view, in elevation, of certain of the engine controls as seen at line 3—3 in Fig. 2;

Fig. 4 is a further and enlarged detail view of additional control means for effecting engine starting operation, the view being taken at line 4—4 in Fig. 2;

Fig. 5 is an enlarged partial sectional detail of the means for connecting the engine governor and fuel control shaft, this view being taken at line 5—5 in Fig. 2;

Fig. 6 is a partly sectional detailed view taken at line 6—6 in Fig. 5;

Fig. 7 is a greatly enlarged side elevational view, partly in section, of a typical liquid fuel supply means together with a detailed disclosure of a control assembly therefor, the view being taken at line 7—7 in Fig. 2;

Fig. 8 is a front view of a part only of the assembly shown in Fig. 7;

Fig. 9 is an additional side view, in fragmentary detail of the primary and secondary liquid fuel supply control means in a control setting differing from that illustrated in Fig. 7;

Fig. 10 is a view similar to that of Fig. 9 but showing a further control setting;

Fig. 11 is a modified form of the means herein preferred for effecting secondary liquid fuel supply control;

Fig. 12 is an enlarged and fragmentary sectional elevation of the principal gaseous fuel supply valve means as seen at line 12—12 in Fig. 2, and Figs. 13 through 16 are each schematic views of the engine air starting, fueling arrangement and the preferred control system therefor, the views illustrating respectively the engine starting phase, the engine conditioned for utilization of liquid fuel alone as in a conventional two-cycle diesel, the engine conditioned for utilization of a gaseous or liquid fuel in automatically varying proportions but predominately set for gaseous fuel operation with a small quantity of liquid fuel supply for purposes of pilot-ignition, and the engine in its shut-down condition with the fuel supply means completely disabled.

Figure 1:
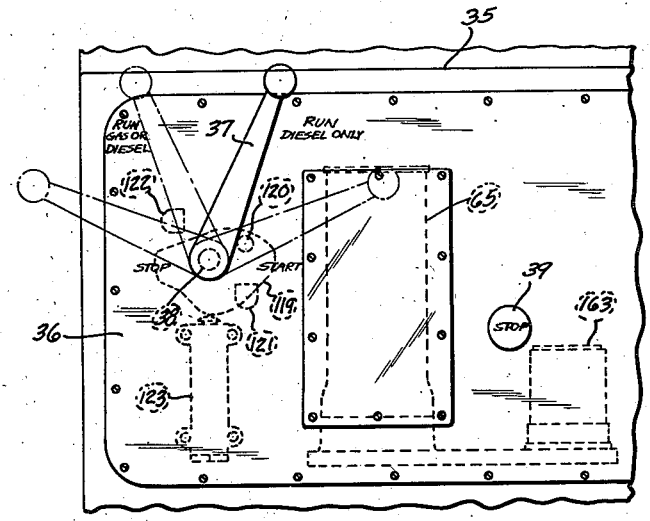
Fig. 1 is a fragmentary side elevational view of the engine and particularly its control panel.
Figure 2:
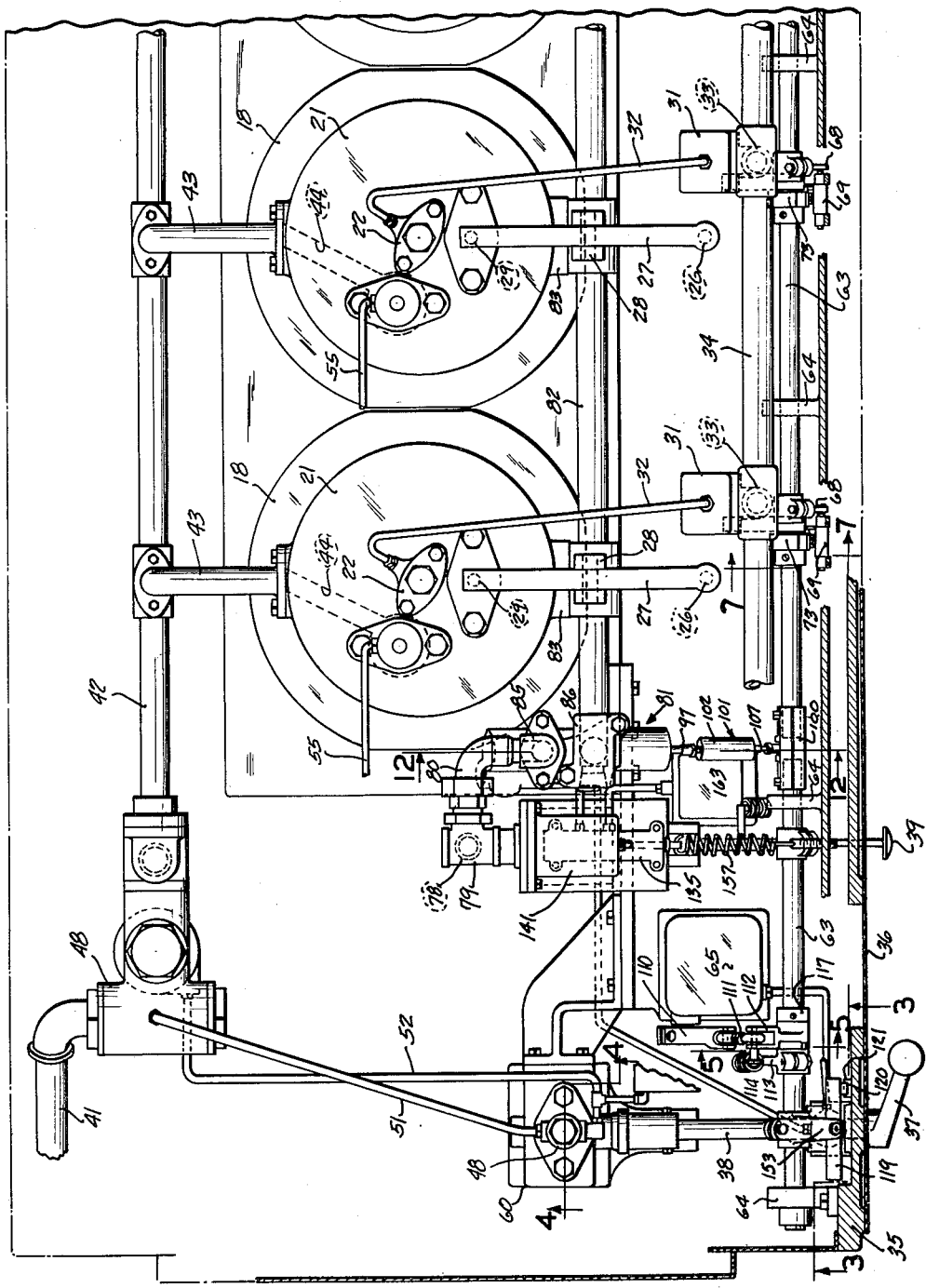
Fig. 2 is a top plan view of a portion of the engine illustrating the general arrangement of controls, fuel supply agencies and starting system in relation to the view of Fig. 1.
Figure 13:
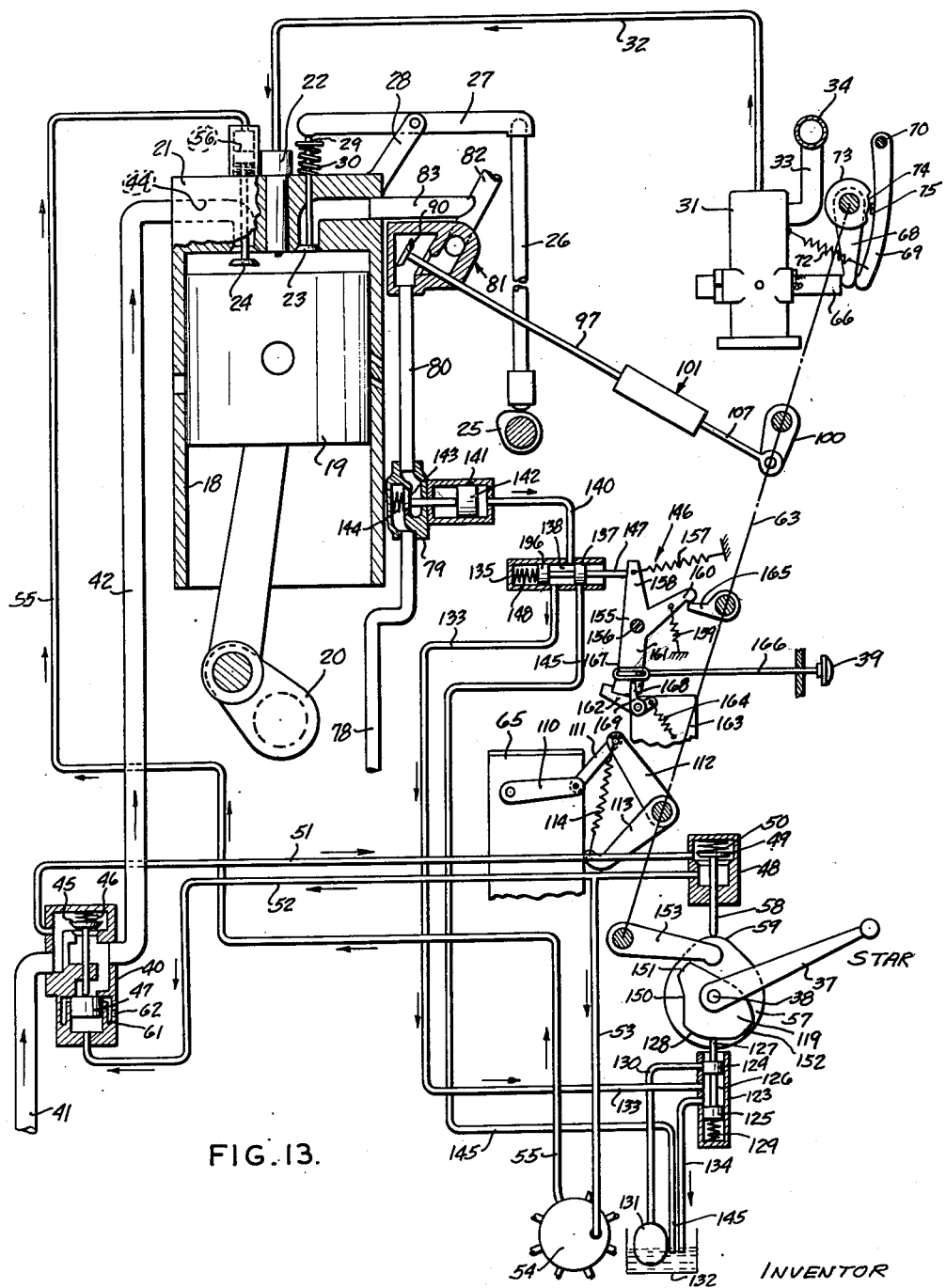

With reference to the several views of the drawing and particularly Figs. 1, 2 and 13, the present invention may be seen to apply to a multi-cylinder diesel type engine in which each cylinder 18, one only being shown in Fig. 13, is provided with suitable scavenging and air inlet ports and an exhaust port controlled by a piston 19 connected to a crankshaft 20 in the conventional manner. The cylinder head structure 21 (Fig. 13) is suitably formed to receive a liquid fuel injection nozzle 22 of any well known solid injection character; a gaseous fuel admission poppet valve 23 and an air actuated starting air admission valve 24, also of poppet type. In the usual way, the gaseous fuel valve 23 is periodically operated through an engine driven cam 25, push rod 26 and a rocker arm 27 pivoted on bracket 28 at a mid-position and operatively contacting the valve stem 29 to urge the same against the normal closing effort of a coiled valve spring 30. The liquid fuel is delivered from an engine operated fuel pump 31 of any well known variable delivery type, such as the Bosch type pump, through a delivery line 32 to the injector valve 22. In this latter arrangement, the pump receives its fuel supply from a branch conduit 33 leading away from the main fuel header 34 for each of the pumps of a multi-cylinder engine.

In an engine of the present dual fuel character, the operating control station is preferably located in a convenient place on the engine frame, only generally indicated at 35 in Figs. 1 and 2, and is shown as comprising a panel 36 removably secured to one end zone of the frame. A control handle 37 is operably mounted at the front of the panel on a shaft 38 for selective angular movement between control settings designated on the panel as "Start," "Run diesel only," "Run gas or diesel," and "Stop." The panel 36 also mounts a "Stop" button 39 which is utilized for emergency stoppage of the engine as will later appear. Movement of the handle 37 to each of its designated positions determines a corresponding sequence of control functions and responses in the engine, but before describing the order of events it will be best to understand the several operating systems associated with the present engine.

*Air start system*

Turning now to Figs. 2, 4 and 13, it will be seen that the air start system for the engine includes a master air supply valve 40 receiving air under pressure from a supply line 41 and delivering the same to a conduit 42 which extends the length of the engine for connection with each of the cylinders 18 through branch lines 43, which are connected to passages 44 in each head 21 for admission to the combustion space through valve 24 at such time as the latter is opened. The master air supply valve 40 is provided with a poppet valve 45 normally urged to closed position by spring 46 and adapted to be opened by movement of a pilot piston 47 into contact with the valve stem as shown in Fig. 13.

Control of the master air supply valve 40 is obtained through a control relay valve 48 having a poppet valve 49 normally urged to closed position by spring 50. This relay valve is connected with the source of air from line 41 by a conduit 51, as indicated, and the delivery side thereof is connected by line 52 to the underside of the pilot piston 47, whereby when the relay valve is opened, the pilot piston will respond by opening the poppet 45 of master supply valve to supply air to the line 42. Concurrently air passing through the relay valve 48 will also flow to branch line 53 and to an engine operated distributor valve 54. The distributor is of the usual construction and is adapted to supply air under pressure to each of the starting air admission valves 24 for opening the same in a predetermined sequence for accomplishing initial rotation of the crankshaft 20. In the present disclosure only one distributor connecting line 55 has been indicated and it is assumed that this line receives the air for actuating a piston element 56 associated with the starting air admission valve 24 to open the latter and admit air from branch line 43 to the combustion space for moving piston 19 downwardly to initiate crankshaft rotation. Once engine rotation is started, the distributor will supply air to others of the cylinders through similar valves and also bleed the line 55 to allow closure of the valve 24 as is well understood.

Opening and closing movement of the relay valve 48 is effected by an air start control cam 57 secured to the shaft 38 (Fig. 4). This cam rotates in a plane such that the cam face may contact the stem 58 of the relay poppet 49 at such times as the cam lobe 59 is moved thereunder, as when the control handle 37 is positioned at "Start" (Fig. 13). In the remaining positions of this handle the cam lobe 59 is displaced and poppet valve 49 remains closed, as shown in Fig. 4. A suitable housing 60 for the air start control cam is secured to a portion of the engine frame and the relay valve 48 is, in turn, mounted on the housing.

When the valve 49 is permitted to close, the master air supply valve 40, air start admission valve 24 and the respective connecting air lines 52 and 55 are automatically relieved of any operative air load through a bleed port, customarily provided but not shown here, in the distributor 54. Moreover, the starting air supply line 42 is also bled as the pilot piston 47 falls and uncovers an opening leading to an annular space 61 formed about the pilot piston cylinder for escape to atmosphere at the vent port 62 (Fig. 13).

Liquid fuel system

The liquid fuel supply system for the present engine embodies a single fuel pump for each cylinder and pump delivery regulating and control means individual to each thereof. Hence a description of one typical and preferred regulating and control means will be sufficient for present understanding. As may be seen in Figs. 2 and 13 each fuel pump 31 is regulated by means of a common control shaft 63 which is suitably rotatively mounted in spaced bearing brackets 64 fixed to the general frame structure 35 to extend the length of the engine. This control shaft 63 is operatively connected to an oil pressure operated type fuel controlling governor 65, later to be described in more detail, whereby governor response to fuel demands of the engine will effect a rotational adjustment of the shaft and a corresponding adjustment at each pump 31.

Turning now to the disclosure of Figs. 7 and 8, the fuel pump 31 shown is of the well known Bosch type in which the reciprocating plunger (not shown) is rotatively actuated for effective variation of its delivery capacity by a rack bar 66. A spring 67 abutting one end thereof constantly urges the rack to a zero fuel delivery setting as indicated by suitable indicia scribed on the exposed body of the bar. The control end of this rack projects outwardly of the pump housing for selective engagement by and control influence of a primary control element 68 and a secondary control element 69. The primary control element or arm 68 is suitably clamped or otherwise fixed on the control shaft 63 to move therewith in response to governor action and hence is capable of moving the rack bar 66 inwardly to a maximum fuel delivery setting for the pump (Fig. 13).

On the other hand the secondary control element or lever 69 is pivotally mounted on a bracket 70 carried by a side plate member 71 of the general frame 35. This lever 69 extends downwardly for operative engagement of its lower end with the rack bar 66 under the influence of a tension spring 72. In cooperation with the lever 69, a pilot fuel control cam 73 is fixedly arranged on the fuel control shaft 63 such that its working profile 74, which is recessed or cut below the general cylindrical contour of the cam body, may be positioned relative to an adjustable cam follower element or pin 75 on the lever 69 to regulate the operative position of the lever in opposition to the lever spring 72. It can be seen in Fig. 7 that the fuel control shaft 63 is rotated such that the primary control arm 68 is in full control of the rack bar position or setting and that the secondary control element 69 is held out of contact with the rack due to the abutment of the follower pin 75 with the cam surface 74. Motion of the shaft 63 in a clockwise direction will not alter the position of the secondary control element 69 provided the cam face 74 is truly cylindrical, as is preferred here. Counterclockwise rotation of shaft 63 (see Fig. 9) will cause the primary control arm 68 to move in a fuel decreasing direction until it eventually will move out of contact with the rack 66, and as this contact is broken the rack will automatically come into contact with the secondary control element 69 and no further rack adjustment will occur as the spring 72 is selected to be slightly more powerful than spring 67 for the rack 66. The view of Fig. 10 illustrates a further operative relationship of the above described parts at the time the engine is to be shut down. Here the fuel control shaft has been rotated still farther in a counter clockwise direction such that the follower pin 75 on the secondary control element 69 is caused to ride out of the recessed cam and upon the raised cam surface 73 by reason of the ramp face 76 which defines one limit of the cam surface 74. When this latter condition is achieved the secondary element 69 is caused to move back against the tension of the spring 72 and allow movement of the rack bar 66 to a zero fuel delivery setting.

As will later be made to appear, the view of Fig. 7 illustrates a condition of diesel operation alone, the view of Fig. 9 is that for pilot-ignition supply of liquid fuel for gaseous fuel operation, and the view of Fig. 10 indicates a zero liquid fuel delivery setting of the pump rack. In all these views the cam face 74 is indicated as being of a constant radius contour which determines a constant position of the secondary control element 69 and hence a substantially constant minimum fuel delivery setting of the pump rack at such times as the primary control arm 68 relinquishes control over the rack setting. Therefore, during the period of gaseous fuel operation of the engine, as will appear presently, the supply of a pilot-ignition charge of the liquid fuel will be determined by the cam face 74 to be constant over the full range of load and gaseous fuel supply variations.

Since there are variations in engine types and characteristics, it may be desirable to vary the quantity of liquid pilot-ignition fuel supplied, either in direct proportion to load variations, or in an inverse proportion to load variations. It also may be desired to advance or delay the time when the secondary control begins or actually assumes direct and positive control of the liquid fuel pump rack 66. One such condition is suggested in Fig. 11 where the cam face 74a is disclosed as having a spiral trend from the beginning zone thereof corresponding with a maximum liquid fuel delivery to the pump shut-off ramp 76a at the terminus of the effective cam contour. From what has been noted above, the suggested spiral cam face 74a is of positive inclination and acts to permit a more-or-less uniform decrease in the supply of liquid pilot-ignition fuel. Of course, a negatively inclined cam face may be utilized in place of cam face 14 or 74a where the pilot-ignition charge of liquid fuel is to be increased for decreases of gaseous fuel supply.

In a liquid fuel supply system of the present character where it is desirable to provide a single fuel pump for each cylinder and to have such pump operate at times with maximum delivery and at other times with merely a pilot-ignition delivery, it is beneficial to obtain a balanced delivery between all the pumps at these extremes. This balancing of pump delivery is accomplished in a novel manner by providing an adjustable eccentric element 77 on the rack operating end of the primary control member and a similar eccentric element 77a on the rack operating end of the secondary control arm 69 (Fig. 8). Each of these eccentric elements 77 and 77a may be rotated to a proper setting and thereafter locked in place by a jam nut, as shown. This feature is of particular importance because it allows each of the fuel pumps 31 to be calibrated and installed in such a way that it will be balanced with the others at full load fuel position of the rack 66. Due to manufacturing variations, pumps which are balanced at full load settings cannot be expected to maintain the proper balance at or near the no fuel rack positions. The introduction of the secondary control element 69 allows for individual adjustment and balancing therebetween of the amount of pilot-ignition fuel injected. Thus, when supplying the engine primarily with the gaseous fuel, the pilot-ignition charge of liquid fuel may be carefully adjusted with the result that operation will be balanced and smooth by virtue of equal or substantially equal amounts of pilot-ignition fuel charges to each of the cylinders.

*Gaseous fuel system*

The gaseous fuel supply system for the present two-cycle diesel type engine is shown schematically in Fig. 13 and in important details in Figs. 2 and 12. Essentially, a main gaseous fuel supply line 78 leading from a source of such fuel (not shown) is connected through a master shutoff valve 79 and line 80 with a control valve assembly 81 which is located at the inlet end of a suitable gaseous fuel feed manifold 82 extending the length of the engine. The manifold 82 is connected with each cylinder by individual branch lines 83, each of which leads to a gaseous fuel admission valve such as the one diagrammatically shown at 23 in the cylinder head 21 of Fig. 13.

The control valve assembly 81 (Fig. 12) includes a valve casting 84, an inlet fitting 85 and an outlet fitting 86, each such fitting being arranged to open to one of the respective passages 87 and 88 in the main casting 84. The inlet passage 87 connects with a valve chamber 89 in which is mounted a balanced type double poppet valve 90, one poppet 90a controlling a port to an outlet chamber 91 and the other poppet 90b controlling a port to a second outlet chamber 92. The respective chambers 91 and 92 communicate with the outlet passage 88 as indicated, there being a passage 91a leading from chamber 91 around the valve chamber 89 to the outlet passage 88.

The outer end of the valve casting 84 is open to atmosphere, however the chamber 91 is sealed by a bellows member 93 of the Sylphon type suitably secured to the head of the poppet 90a and to a bellows retainer element 94 threaded into the end of the valve casting as shown. Below the remaining poppet 90b, the valve structure 90 is provided with a guide stem section 95 slidably seated in the sleeve 96. A valve stem extension 97 passes through an enlarged chamber in which a second bellows member 98 is positioned to afford a positive seal at that end of the valve casting 84. This latter bellows is secured to the stem 97 and to a retainer element 99, and is arranged to be open to atmosphere and hence to balance the bellows 93 such that the poppet elements 90a and 90b are balanced at all times. To prevent valve lock, the chamber for bellows 98 is placed in communication with chamber 92 by means of an open passage 95a formed in the guide stem section 95.

Actuation of the valve 90 is accomplished through a crank arm 100, suitably clamped to the governor controlled fuel shaft 63 (Fig. 12). The crank is operatively connected with the valve stem 97 through a resilient connector device 101 which comprises a cylindrical sleeve 102 pin-connected to the enlarged and adjustably attached end portion 103 of the stem 97, and a sleeved retainer 104 welded, threaded or otherwise secured in the end of the sleeve 102 to hold a coiled spring 105 in position of abutment with the enlarged upper end 106 of a connector link 107, the opposite end of this link extending outwardly of the sleeved retainer for pivotal connection with the crank arm 100, as shown. Thus, in operation, as the governor 65 moves or rotates the fuel control shaft 63, the crank arm will cause the link 107 to move the valve stem 97 to open or close the poppet valve 90. Normally spring 105 will act to hold the link head 106 in solid abutment with the adjustably attached portion 103 of the valve stem for either opening or closing movement of the valve 90; but due to certain characteristics of the present control system to be noted later, a desirable degree of overtravel or relative movement between the link 107 and valve stem 97 will be possible, as by the yielding nature of the spring 105.

*Engine control system*

The control system presently preferred for this engine comprises a manual type of selective control whereby the operation of the engine may be determined according to the wishes of the operator and in which the engine may be quickly and easily converted from a true diesel utilizing liquid fuel alone to a gas engine operating on the Diesel cycle and utilizing gaseous fuel with at least a pilot-ignition charge of liquid fuel of a predetermined quantity, or utilizing variable proportions of both the liquid and gaseous fuels. The control system also comprises a fuel regulating system which is responsive to a fluid pressure actuated governor, of the Woodward type for example, which is driven by the engine, and in which the governor and certain connecting mechanism is common to each fuel supply system, thus making the governor action substantially independent of the availability of either fuel and hence capable of demanding more or less fuel, whether it be liquid or gaseous fuel, solely in accordance with the needs of the engine. With governor controlled mechanism of this character it is readily possible to convert the engine to the use of either fuel with the least difficulty.

Turning now to Figs. 3, 5, 6 and 13 in particular, the fuel regulating system is seen to include the governor 65 in which its control arm 110 is operatively connected to the fuel control shaft 63 by means of a link 111 which is pivotally attached to a first crank 112 and this crank, in turn, is arranged to move the shaft 63 through a second crank 113 and a yielding element such as the spring 114. The first crank 112 is loosely or relatively movably mounted on shaft 63 (Figs. 3, 5 and 6), but its hub is formed at one side face with an axially extended lug 115 which is adapted to mesh with a cooperating lug 116 formed on the adjacent face of the hub portion of the second crank 113. In this arrangement the crank member 113 is securely clamped to the shaft 63 and a fixed collar 117 retains the free crank arm 112 against axial movement. The lug 115 extends about the shaft 63 for substantially 180 degrees of arc and the remaining lug 116 is somewhat less in arcuate extent to permit a limited lost motion relation between the respective cranks. Normally the spring 114 holds these cranks against relative movement, and is so chosen that movement of the governor actuating arm 110 will effect concurrent movement of the cranks 112 and 113 for either direction of governor actuation. However, due to a preferred condition of operation to be described presently, it may happen that the fuel control shaft 63 must be rotated in a direction to prevent fuel delivery by pump 31, and this control action is best accomplished without also forcing or overcoming the governor load on arm 110 to move the latter in a fuel decreasing direction. Hence, the shaft 63 may be rotated against the governor setting thereof by overcoming only the spring 114 and this relative movement is facilitated by the lost-motion provision existing between the meshing lugs 115 and 116 on cranks 112 and 113 respectively.

It will now be appreciated that the governor 65 effectively adjusts the rotational setting of the fuel control shaft 63 and from inspection of Fig. 2 for example, it will also be seen that the shaft 63 is extended alongside the several cylinders 18 of the engine. As was described in connection with Fig. 7, the fuel control shaft 63 is operatively related with each of the fuel pumps 31 through the primary control members 68 and by means of the cams 73 and secondary control elements 69, the latter members, elements and cams being duplicated for each pump 31. A further feature of the disclosure of Figs. 2 and 13 resides in the provision of the connecting and operating crank means 100 for setting the gaseous fuel control valve 90 in accordance with the governor setting of the fuel control shaft 63. Thus the liquid and gaseous fuel supply systems are effectively subject to the action of the governor 65.

The manual type of selective control for the present engine is schematically shown in Fig. 13 and more in detail in Figs. 1 through 4 wherein the control handle 37 is secured to the shaft 38 for rotating the latter through each of the control positions indicated (Fig. 1) as "Start," "Run diesel only," "Run gas or diesel" and "Stop." The shaft carries a selector cam 119 (Figs. 2 and 3) which is provided with a stop pin 120 for abutment with either of two spaced stop lugs 121 and 122 located on the frame 35 at the maximum positions of travel of the handle 37. As was described above, the shaft 38 carries the starting air control cam 57 (Fig. 4) whereby the two cams may be positionally adjusted concurrently for correlating the respective functions of the several items of apparatus responsive thereto.

Selector cam 119 (Figs. 3 and 13) is formed with a gaseous fuel supply controlling profile which is effective for determining the positional setting of an hydraulic type control valve 123 now to be described. The valve 123 contains a slide element having spaced pistons 124 and 125 forming therebetween and with the wall of the valve casing or cylinder a fluid transfer chamber 126. The slide element is provided with an operating stem 127 which projects into the path of movement of the cam 119 such that the cam lobe or profile 128 thereon will act to hold the slide element against the spring 129 in an inwardly set position during the time control handle 37 is in both the "Start" and "Run diesel only" positions, a comparison of Figs. 13 and 14 being sufficient to disclose this feature. The control valve 123 is provided with a fluid pressure supply line 130 which leads from a pump 131, such as that provided for supplying lubricating oil to the engine bearings and other moving parts (not shown) located in a suitable sump 132. This feed line 130 opens to the valve 123 in the zone controlled by the slide piston 124 and in the showing of Fig. 13 is closed thereby. A second hydraulic line 133 opens to the valve 123 intermediate the respective slide pistons 124 and 125 and, as will appear, may be both a supply and a drain or return line, the latter condition being evident in Fig. 13 since the line opens to the transfer chamber 126 of the valve and this chamber, in turn, is in communication with the sump 132 through a drain line 134 also opening to the chamber 126 at a zone just above the slide piston 125. The hydraulic line 133 leads to a relay valve 135 associated with the master shut-off valve 79 in the gaseous fuel supply system before described.

The relay valve 135 is essentially a duplicate of the control valve 123 and comprises a slide element having spaced pistons 136 and 137 defining therebetween a transfer chamber 138 which the line 133 opens in the control vicinity of the slide piston 136, as shown in Fig. 13. An outlet line 140, leading from a zone intermediate the respective slide pistons, connects with the cylinder 141 of the master shutoff valve 79 such that fluid under pressure entering this cylinder will force the piston 142 to open the poppet 143 in opposition to a closing spring 144.

The relay valve 135 also is provided with an emergency fluid drain line 145 for return of the hydraulic fluid to the sump 132. However, the slide pistons 136 and 137 are normally positioned as shown in Fig. 13 to close the drain line 145 and maintain lines 133 and 140 in communication through transfer chamber 138. This is accomplished by means of an over speed safety mechanism 146 which is set to abut the valve stem 147 and hold the slide pistons inwardly against the urging of spring 148. The mechanism 146 will be more particularly described presently, but in all essential details is similar to that shown and more fully described in another patent application to Stewart D. Klinger, filed January 11, 1947, and bearing Serial No. 721,593.

Referring again to Fig. 3, it can be seen that for positionment of the control handle 37 either as shown or when displaced approximately 45 degrees clockwise, the profile 128 of the selector cam 119 will be effective to retain the valve stem 127 in its depressed position, thereby preventing the flow of hydraulic fluid under pressure from the control valve 123 through line 133 and relay valve 135 to the cylinder 141 of the master shutoff valve 79 for opening the same. Thus the latter valve will remain closed in these two positions of the control handle 37, and the gaseous fuel supply effectively disabled regardless of the setting of the control valve 90 (Fig. 12).

The selector cam 119 is further profiled to provide a recessed cam profile 150 located so as to be moved over the valve stem 127 (Fig. 3) upon control handle movement approximately 45 degrees counterclockwise from that shown. When this movement of the cam 119 is carried out, the valve slide pistons 124 and 125 will be urged upwardly (Fig. 13) to open the line 130 to the transfer chamber 126 and thus supply fluid under pressure to the line 133 and to relay valve 135. A further counterclockwise rotation of the selector cam 119 through an additional 45 degrees will bring the cam lobe 151 over the stem 127 to depress the latter as before. The exact purpose and effect of this cam motion will appear hereinafter.

Figure 16:
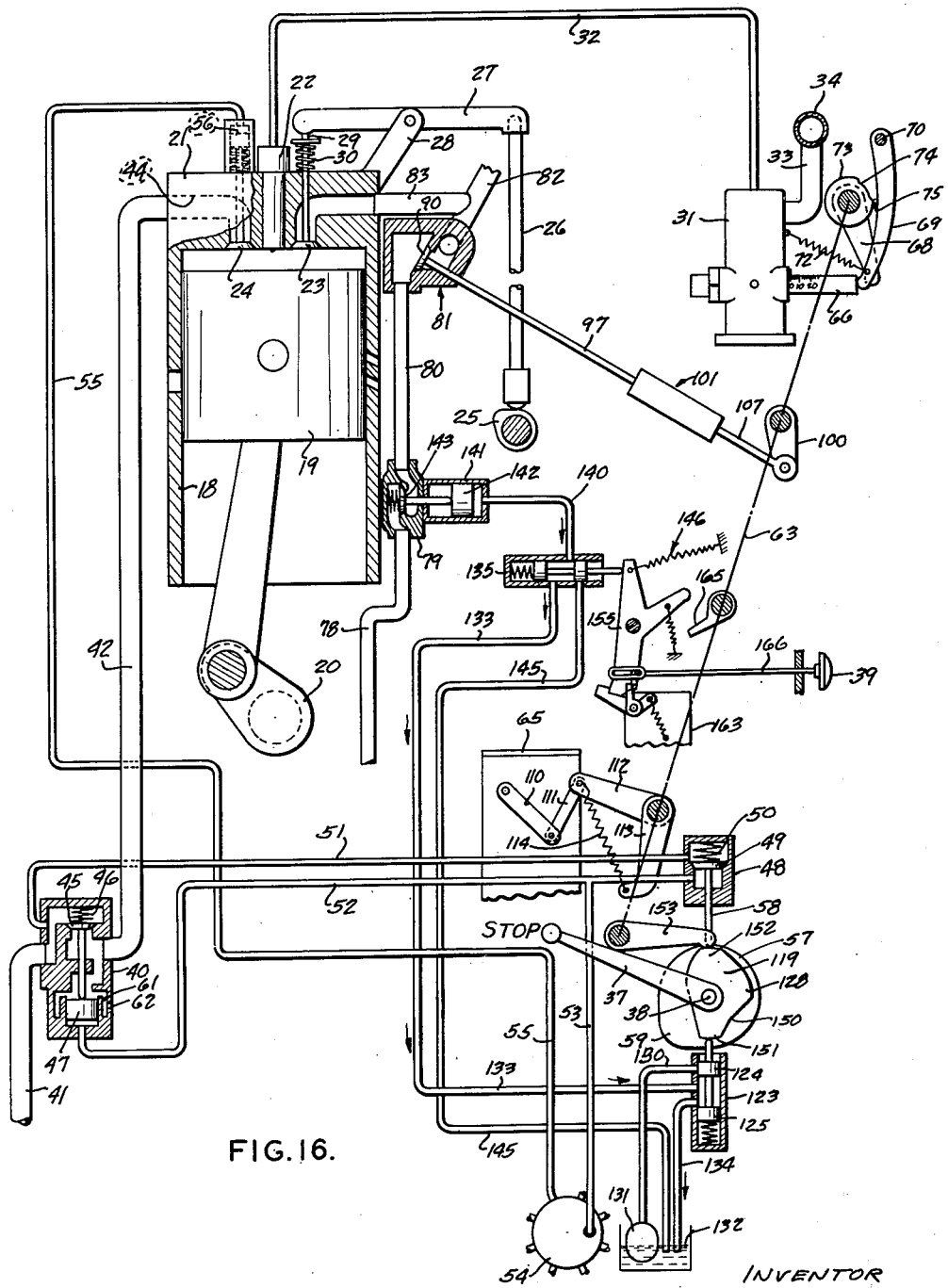

A further function of the selector cam 119 is to adjust the fuel control shaft 63 when it is desired to override the action of governor 65 and prevent delivery of any liquid fuel from pump 31. This is accomplished by the provision of the cam lobe 152 in conjunction with a crank arm 153 fixed on the fuel control shaft 63 in position to be contacted by the cam lobe 152 and moved upwardly thereby upon shifting of the control handle 37 to its "Stop" position (Fig. 16). The crank arm 153 is provided with an adjustable type cam follower element 154 (Fig. 3) to enable the proper adjustment of the degree of throw or movement desired therefor.

Control setting "start"

Having now clearly in mind the construction, arrangement and character of the several control means, means for supplying fuel and other pertinent operational adjuncts, it will be well to describe the order of events expected to occur at each setting of the control handle 37 for a clear understanding of the exact nature of the present improvements. Accordingly reference will be made specifically to Figs. 13 through 16 for this purpose, it being evident that each of these views is a schematic disclosure of the preferred controls and gaseous and liquid fuel supply systems relative to only one cylinder of a diesel engine of the two-cycle type.

Specifically then, in Fig. 13 the present improvements are shown as they would be conditioned for effecting compressed air starting of the engine and subsequent diesel operation, that is starting with liquid fuel alone. The control handle 37 is positioned at "Start" and in this setting the selector cam 119 sets the control valve 123 to prevent hydraulic fluid from passing into the line 133 and to relay valve 135 for opening the master shut-off gaseous fuel valve 79. Simultaneously, the cam 57 opens relay valve 48 to supply air through line 52 to open the master air supply valve 40, and through branch line 53 to the starting air distributor 54. Assuming that the distributor is set to allow air flow in line 55, it can be appreciated that the valve 24 will open to admit air to the cylinder from lines 42 and 44. As a consequence, the piston 19 moves down and initiates rotation of the crankshaft 20 and the camshaft 25 geared thereto (not shown). This initial rotation moves the distributor to the next valve line and the same process occurs in the associated cylinder to continue crankshaft rotation. As the rotational effort continues and the speed is increased, an oil pump (not shown) connected with the governor 65 builds up pressure therein and the governor arm 118 moves from its no fuel position to the position of maximum fuel, as shown. Accordingly the fuel pump 31 will be conditioned for maximum fuel delivery by reason of the rotation of the fuel control shaft 63 and movement of primary control crank 68 to move the rack 66 to its full in position. At the same time, the rotation of the fuel control shaft 63 opens the control valve 90, but no gaseous fuel is available since the valve 79 is maintained closed or disabled by spring 144. The engine must then begin operation on liquid fuel alone; and when this occurs, the operator moves the control handle to position "Run diesel only."

To summarize the conditions obtaining at the "Start" position of handle 37, it is evident that:

1. The self-closing, hydraulically opened, master shutoff valve 79 is closed due to the positional setting of valve 123 under the influence of the selector cam 119;
2. The fuel control shaft moves under the influence of the oil operated governor 65 to a full fuel setting, but the exact position of the shaft may vary with differing phases of the starting cycle;
3. The gaseous fuel control valve 90 is open even though no fuel is available due to disabling of the shutoff valve 79 by spring 144 and lack of pressure in cylinder 141, and
4. The cam 73 is rotated to a "Fuel on" position in which the follower element 75 of the secondary control element 69 is riding on the cam surface 74, but is not effective as the primary member 68 has moved the pump rack 66 in beyond the range of the secondary element 69.

Control setting "run diesel only"

Figure 14:
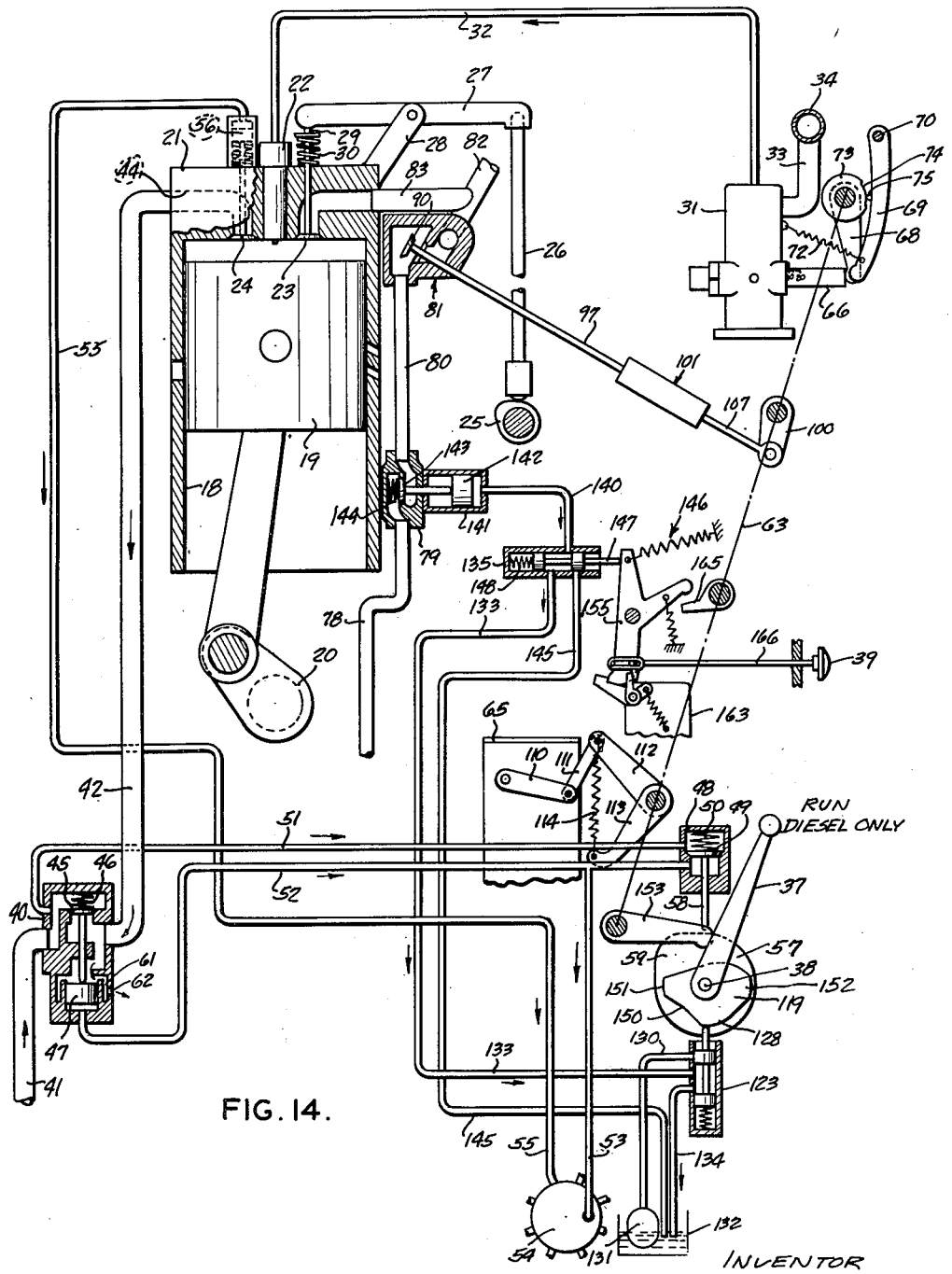

Turning to Fig. 14, it will be observed that the control handle 37 has been moved counterclockwise to the "Run diesel only" position in which the selector cam 119 still retains the valve 123 in condition to prevent hydraulic fluid from passing to the relay valve 135 and to the master shut-off valve 79 to open the latter. Thus no gaseous fuel can be supplied to the engine at this time. The effect of shifting the control handle to this second position is to rotate the cam 57 so that the cam lobe 59 moves away from the relay valve and this valve closes, shutting off the air suppy to line 52 and branch line 53. As a result the master air supply valve 40 is closed upon downward movement of the pilot piston 47 and the vent port 62 is opened to bleed the air line 42. At the same time, the air supply to the distributor 54 is cut off and no further operation of the valve 24 is possible. Accordingly, the engine operates as a full diesel with the fuel pump 31 under control of the governor 65 through the fuel control shaft 63 and primary control member 68. With no load on the engine, the governor 65 will adjust the fuel control shaft 63 and hence the pump rack 66 for delivery by the pump 31 of sufficient fuel to maintain rated idling speed. The view of Fig. 14 illustrates the fuel pump rack position substantially in excess of an idling speed setting, but after a period of running the correct setting will be attained, as is more nearly the condition shown in Fig. 7.

The full diesel operation having been attained, the engine may now be connected with a load. The governor 65 automatically responds to the load placed on the engine by rotating the fuel control shaft 63 in a clockwise direction (Fig. 7) to move primary control member 68 in a similar direction and urge the respective pump racks 66 inwardly for increasing the quantity of liquid fuel delivered to the injectors 22.

Summarizing the conditions obtaining when the control handle 37 is set in position "Run diesel only," it is clear that:

1. The gaseous fuel shut-off valve 79 is disabled due to lack of fluid under pressure in cylinder 141 as a consequence of the setting existing at valve 123;
2. Fuel control shaft 63 is positioned by the governor 65 in accordance with the liquid fuel requirements to carry the load on the engine;
3. The gaseous fuel control valve 90 is open but ineffective as no gaseous fuel can be supplied by the disabled valve 79, and
4. The secondary liquid fuel control element 69 is positioned on the cam surface 74 but is ineffective to influence the position of pump rack 66 due to the inward setting thereof by the primary control member 68.

*Control setting "run gas or diesel"*

Under this control setting of the handle 37, the operation of the engine may be automatically varied for gaseous fuel supply, for liquid fuel supply or for gaseous fuel supply with more than a pilot-ignition charge of the liquid fuel. Each of these conditions will now be described in connection with the schematic view of Fig. 15.

Assuming that the engine has been operating at idling speed with no load, although the following description will also apply when the engine is under load, the operator may now shift the control handle 37 counter clockwise to the "Run gas or diesel" position, as shown, to effect the desired conversion of the engine from full diesel operation to a gaseous fuel operation. The control change which follows is initiated by the motion of the selector cam 119 to a position in which the cam profile 150 moves over the valve stem 127 and allows the slide pistons 124 and 125 to move upwardly, thus changing the hydraulic pressure system to an active status from its formerly inactive status. The fluid transfer chamber 126 of this valve now directs fluid from line 130 under pressure from pump 131 into line 133 and to the transfer chamber 138 of the relay valve 135 for unimpeded flow to the operating cylinder 141 at the master shut-off valve 79. Consequently, this valve and specifically its poppet 143 opens and admits gaseous fuel to the supply line 80 for the control valve 90. It will be remembered from the disclosure of Fig. 14 that the governor 65, in regulating the liquid fuel pump 31, causes opening movement of the double poppet 90 of valve 81 and gaseous fuel can, therefore, flow directly to the admission valve 23 through header 82 and branch line 83.

In this phase of the conversion from liquid to gaseous fuel supply there will ordinarily be a period when the sum total of the two fuels admitted to the combustion chamber is in excess of the requirements of the engine. Accordingly, the governor 65 will respond to the resulting engine speed increase by moving its actuating arm 110 clockwise (Fig. 15) to rotate the fuel control shaft 63 in a fuel decreasing sense. This action causes the primary control member 68 at the pump 31 to move counterclockwise and permit the control rack 66 to move outwardly. At the same time, the crank 100 moves the double poppet 90 of valve 81 (Fig. 12) in a closing direction to reduce the supply of gaseous fuel. As before noted, when the engine is thus converted at no load, a balance point will be reached by the governor 65 when the sum total of the gaseous and liquid fuels is just right to maintain engine operation. This point will find the fuel pump primary control member 68 moved out of contact with the rack 66 and the secondary control 69 in command thereof through the setting of the cam 73. The fuel pump 31 will then be delivering only a pilot-ignition charge of liquid fuel, which will remain constant until the primary member 68 again assumes control. However, the angular relation of crank 100 will be such as to have the gaseous fuel control valve substantially full open for supplying a maximum charge of fuel, and the governor 65 will continue to move in a fuel decreasing direction wherein only the gaseous fuel supply valve 81 is affected.

From what has been said above, it will be observed that the gaseous fuel valve 81 is moved through a full open and hence an "over travel" phase during the time the liquid fuel pump is being throttled from its maximum delivery setting to its setting for delivery of only a pilot-ignition charge of fuel. This fuel control feature is effectively differentiated by the selected position of the manual control handle 37 and its resulting determination of the opened or disabled condition of the master shut-off valve 79 in the gaseous fuel supply system. A careful comparison of Figs. 14 and 15 will show that in the first view the controls are conditioned for full diesel operation only, whereas in the second view the controls are conditioned to result in an immediate conversion of the engine to utilization of a gaseous fuel attended by the supply of a constant pilot-ignition charge of liquid fuel.

In this latter case, the constant radius configuration of the cam profile 74 and the setting of the follower pin 75 on the secondary control element 69 is, by preference, effective to continue liquid fuel delivery, but in an amount insufficient of itself to maintain engine operation at no load and rated idling speed. However, this preferred control condition with respect to the liquid fuel supply pump may be varied as desired in keeping with the suggested variations discussed in connection with Fig. 11 so as to provide a change in the amount of the pilot-ignition charge of liquid fuel, either in an increasing or decreasing ration with increase of the gaseous fuel supply.

Figure 15:
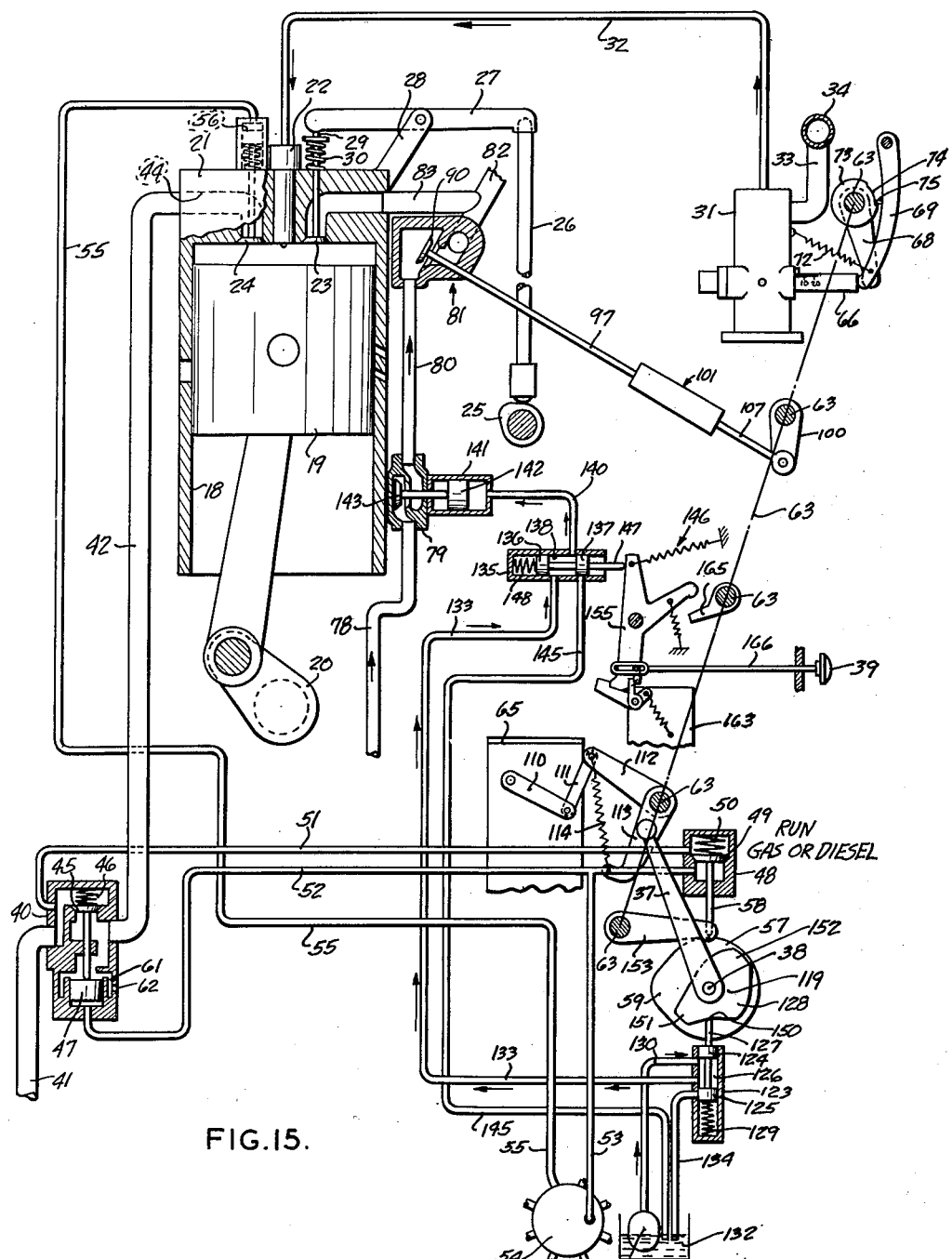

A second possible control phase arising from the setting of the control handle 37 in Fig. 15 will occur automatically if the supply of gaseous fuel into line 78 should fail completely, as by either exhaustion of the supply of such fuel or by the accidental or deliberate act of cutting off the supply. When any of these events do occur, the loss of the required charge of gaseous fuel will cause a governor response to demand more fuel. Accordingly the governor 65 will cause its arm 110 to move counterclockwise toward the full fuel position and thus rotate the fuel control shaft 63 further to open the gaseous fuel valve 81. No gaseous fuel being now available, this governor actuation will continue and cause the primary control member 68 to again assume direct control over the fuel pump rack 66, moving the same inwardly to increase the delivery of the liquid fuel by pump 31.

If, instead of a complete failure of the gaseous fuel supply, a drop in supply pressure occurs, the governor 65 will automatically respond by moving to increase the total fuel delivered. If the opening movement of the gaseous fuel valve 81 does not induce sufficient gas flow to carry the load, the governor 65 will rotate shaft 63 even farther to initiate an increase of the liquid fuel supplied by the pump 31 to something more than the pilot-ignition charge. The engine is now effectively operated on less than the required charge of gaseous fuel and a charge of liquid fuel in an amount in excess of its pilot-ignition charge to make up the necessary fuel charge for the load on the engine.

It will now be fully apparent that the present improvements give a full and complete flexibility of engine operation and one that is automatic in nature. The reliability of engine operation to carry a sustained load is fully complete, since the automatic character of the fuel control system under the command of the governor 65 will insure an adequate supply of fuel in amounts sufficient to maintain speed under load.

A further improvement in the control systems above described resides in the reversibility thereof, so as to permit the operator to return the engine to full diesel operation alone. This is easily accomplished by moving the manual control handle 37 from the position "Run gas or diesel" to the former position "Run diesel only." Upon movement of handle 37 in this reverse direction, the master shut-off valve 79 is disabled as the shifting of the valve 123 bleeds fluid line 133 from the relay valve 135 back to the sump 132, permitting the poppet 143 in valve 79 to move to its closed position. The governor 65 on the other hand, will respond by shifting the primary control member 68 into command of the pump rack 66 to increase the delivery of liquid fuel from pump 31.

Control setting "stop"

Reference to Fig. 16 will now be had for an understanding of the control response when it is desired to shut off the engine completely. As there shown, the control handle 37 upon movement to the "Stop" position shifts the selector cam 119 to a position in which the cam lobe 151 again depresses the stem 127 of valve 123 for causing closure of the master shut-off valve 79 in the gaseous fuel supply system, as is now understood. The contour of the lobe 151 is such as to accelerate the movement of the valve 123 for a desirably rapid stoppage of the gaseous fuel supply. Concurrently, the cam lobe 152 of the selector cam 119 comes into play by moving under the crank arm 153 and forcibly raising the same in a direction to rotate the fuel control shaft 63 in a counter clockwise sense and far enough to bring the ramp 76 of the cam 73 (Fig. 10) under the follower pin 75 of the secondary control element 69. Thus the latter element, as well as the primary control member 68 fixed on the shaft 63 is moved away from the fuel pump rack 66 and the rack can then move to a zero setting. Since the fuel control shaft 63 is forcibly moved to a no fuel position against the action of governor 65, the gaseous fuel control valve 81 is also moved to a closed position and no further fuel can be supplied to the engine.

It is preferred to select an angular relation between the crank 100 and the no fuel setting of ramp 76 on cam 73 such that the gaseous fuel control valve 81 closes fully and slightly in advance of the attainment by the pump rack 66 of its zero setting to assure complete discontinuance of the gaseous fuel supply. This is attained by the interposition of the yielding means 101 between crank 100 and the stem 97 of the double poppet 90 in valve assembly 81. Closure of the valve 81 in advance of the pump rack movement to the zero fuel setting is desirable as there is eliminated the collection or retention of residual gaseous fuel in the header 82 leading to the branch lines 83 for each cylinder.

Engine overspeed and safety stop

In Fig. 13, as well as in the subsequent schematic views, the emergency stop mechanism 146 comprises an actuator 155 pivoted on the engine frame structure (not shown) at pin 156 and urged in a clockwise direction by a first spring 157 on arm 158 and a second spring 159 on arm 160. A third arm 161 of this actuator 155 is engaged in a notched trip finger 162 operably actuated by an overspeed governor 163 to a release position, but normally held in holding engagement with the arm 161 by a tension spring 164. This mechanism 146 is normally set as shown such that the arm 160 of the actuator is clear of a crank element 165 fixed on the fuel control shaft 63 and the arm 158 abuts the stem 147 of the relay valve 135 to hold the slide pistons 136 and 137 thereof in the position shown.

Should the engine overspeed for any reason, the overspeed governor 163 will move trip finger 162 downwardly and release the actuator arm 161. As a consequence, the actuator 155 is immediately shifted clockwise by the springs 157 and 159 to cause contact of arm 160 with the crank element 165, forcibly rotating the fuel control shaft 63 to shut off both the gaseous and liquid fuel supply systems. At the same time, arm 158 allows the relay valve 135 to shift its setting and bleed line 140 through the emergency line 145 to the sump 132. Shifting of the relay valve 135 allows the master shut-off valve 79 to close.

A further safety stop is provided in the nature of the stop button 39 at the front of panel 36. The button 39 is mounted on an extended push rod 166 which, in turn, extends rearwardly to a guide element 167 on actuator 155. The rear guided end of the rod 166 carries a trip finger 168 which is adapted to engage a release lever 169 formed integrally with the governor trip finger 162. Upon inward movement of button 39 the finger 168 engages lever 169 and forces the trip finger 162 away from actuator arm 161 to release the same and cause movement of the actuator 155 to accomplish the same engine function as was noted for the condition when the governor 163 attained its overspeed condition. The stop button 39 and mechanism attached thereto also serves as the means for re-setting the overspeed mechanism 146 after the overspeed governor 163 has tripped the same to effect closure of the gaseous fuel supply shut-off valve 79. The re-set function thereof is realized by an outward pull on the button 39 such that the slotted guide 167 engages the actuator 155 at arm 161 and rotates the same against the urging of springs 157 and 159 until the trip finger 162 engages arm 161 in the manner shown in Fig. 13.

It will now be fully understood that the foregoing engine control improvements and improvements in the systems for supplying a gaseous and liquid fuel to the engine will accomplish each of the objects heretofore stated in a direct, positive and simple manner. No further detailed description of operation and function of the several control systems and means responsive thereto is believed necessary, except to point out and have fully understood that modifications, rearrangements and many other changes may be made

What is claimed is:

1. In a dual fuel internal combustion engine of two-cycle type providing a cylinder and piston therein defining a cylinder combustion space, the cylinder having piston controlled air admission and exhaust ports, the combination therewith of an engine driven pump for the delivery of oil fuel to the cylinder combustion space, said pump having a control element operable to vary pump fuel delivery, valve means for controlling delivery of gas fuel to the cylinder combustion space, an engine driven governor operable through at least two different control ranges, a member connected to said valve means and operable by said governor in one control range thereof, for actuating said valve means to control gas fuel delivery in accordance with engine load demands, means actuated by said member and engageable with said pump control element during governor operation in the other of its control ranges, to operate said control element for varying pump delivery of oil fuel in accordance with engine load demands, said member positioning said means out of engagement with the pump control element during operation of the member by the governor operating in said one control range thereof, and a control member engageable with said pump control element only when said means is out of engagement with the latter, for positioning the pump control element to determine pump delivery of oil fuel in pilot quantity sufficient to effect gas fuel ignition in the engine.

2. In a dual fuel internal combustion engine of two-cycle type providing a cylinder and piston therein defining a cylinder combustion space, the cylinder having piston-controlled air admission and exhaust ports, the combination therewith of an engine driven variable delivery fuel pump for supplying liquid fuel to the cylinder combustion space, said pump having a regulating element operable from an initial no-fuel position for regulating pump fuel delivery, valve means for controlling delivery of gaseous fuel to the cylinder combustion space, an engine driven governor operable through separate control ranges, means including a control shaft actuated by said governor, effective in response to operation of the governor in one control range thereof, for operating said valve means to regulate gaseous fuel delivery in accordance with engine load demands, a primary control arm fixed to said shaft and operatively engaging said pump regulating element during operation of the governor in another control range thereof, to operate the regulating element for varying pump fuel delivery in accordance with engine load demands, a secondary control arm pivotally supported adjacent said regulating element and biased toward said element, and cam means on said shaft and engaging said secondary control arm, said cam means being effective during operation of the governor in said one control range thereof, to position said secondary control arm for engagement with said regulating element such as to position the element for regulating pump delivery to a minimum or pilot quantity sufficient for ignition of gaseous fuel in the cylinder combustion space.

3. In a dual fuel internal combustion engine of two-cycle type providing a cylinder and piston therein defining a cylinder combustion space, the cylinder having piston-controlled air admission and exhaust ports, the combination as defined by claim 2, wherein said primary control arm is removed from engagement with said regulating element in response to and throughout actuation of said control shaft by the governor operating in said one control range thereof.

4. In a dual fuel internal combustion engine of two-cycle type providing a cylinder and piston therein defining a cylinder combustion space, the cylinder having piston-controlled air admission and exhaust ports, the combination as defined by claim 2, wherein said cam means is adapted for effecting limited pivotal movement of said secondary control arm consequent to actuation of said control shaft by the governor when operating in said one control range thereof, the secondary control arm thereby effecting a correspondingly limited operation of said pump regulating element whereby to effect variations in said minimum or pilot quantity delivery by the pump.

5. In a dual fuel internal combustion engine of two-cycle type providing a cylinder and piston therein defining a cylinder combustion space, the cylinder having piston-controlled air admission and exhaust ports, the combination therewith of an engine driven variable delivery fuel pump for supplying liquid fuel to the cylinder combustion space, means for supplying gaseous fuel to the cylinder combustion space, said means including a gaseous fuel metering valve and a supply control valve, an engine driven governor operable through first and second control ranges, governor actuated means effective responsively to governor operation in said first control range, for operating said metering valve to regulate delivery of gaseous fuel to the combustion space and for regulating said fuel pump to limit fuel delivery thereby to a minimum or pilot delivery sufficient for ignition of gaseous fuel in the cylinder combustion space, said governor actuated means further being effective responsively to governor operation in said second control range thereof, for regulating said fuel pump to vary fuel delivery thereby between said minimum delivery and a maximum fuel delivery, and control means operable selectively for effecting an open condition and a closed condition of said gaseous fuel supply control valve, said control means including a cam element operatively associated with said governor actuated means and effective in a selected operation of the control means, for operating said governor actuated means to effect closure of said metering valve and regulation of said fuel pump for no-fuel delivery.

CLARENCE H. SCHOWALTER.

REFERENCES CITED

The following references are of record in the file of this patent:

UNITED STATES PATENTS

| Number | Name | Date |
|---|---|---|
| 1,833,265 | Schmidt | Nov. 24, 1931 |
| 1,858,824 | Heidelberg | May 17, 1932 |
| 2,400,219 | Barnaby et al. | May 14, 1946 |
| 2,400,247 | Miller et al. | May 14, 1946 |
| 2,497,322 | Rathbun | Feb. 14, 1950 |